US008553027B2

(12) United States Patent
Kim et al.

(10) Patent No.: US 8,553,027 B2
(45) Date of Patent: Oct. 8, 2013

(54) GATE DRIVER WITHOUT PRE-CHARGING CAPACITOR IN GATE DRIVING CIRCUIT

(75) Inventors: Hyoung-Rae Kim, Hwaseong-si (KR); Hyo-Sun Kim, Seoul (KR); Yoon-Kyung Choi, Yongin-si (KR); Jae-Youl Lee, Yongin-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 1143 days.

(21) Appl. No.: 12/488,803

(22) Filed: Jun. 22, 2009

(65) Prior Publication Data

US 2009/0322737 A1 Dec. 31, 2009

(30) Foreign Application Priority Data

Jun. 27, 2008 (KR) ........................ 10-2008-0061711

(51) Int. Cl.
*G06F 3/038* (2013.01)

(52) U.S. Cl.
USPC .......................................................... 345/215

(58) Field of Classification Search
None
See application file for complete search history.

(56) References Cited

U.S. PATENT DOCUMENTS

| | | | | |
|---|---|---|---|---|
| 4,345,248 | A * | 8/1982 | Togashi et al. | 345/90 |
| 5,642,134 | A * | 6/1997 | Ikeda | 345/174 |
| 6,756,957 | B2 * | 6/2004 | Park | 345/92 |
| 2005/0052393 | A1 * | 3/2005 | Kobashi | 345/96 |

FOREIGN PATENT DOCUMENTS

| | | | |
|---|---|---|---|
| EP | 1720148 | A2 * | 11/2006 |
| JP | 2004-101646 | | 4/2004 |
| JP | 2005-321510 | | 11/2005 |
| KR | 1020060064853 | | 6/2006 |

OTHER PUBLICATIONS

English Abstract for Publication No. 2004-101646.
English Abstract for Publication No. 2005-321510.
English Abstract for Publication No. 1020060064853.

* cited by examiner

*Primary Examiner* — Alexander S Beck
*Assistant Examiner* — Kirk Hermann
(74) *Attorney, Agent, or Firm* — F. Chau & Associates, LLC

(57) ABSTRACT

A display panel driving apparatus and a method of driving the same are provided, and, in particular, a gate driver and a method of driving the gate driver. The gate driver includes a decoder that decodes gate line selection data and that generates a gate line selection signal. A gate driving circuit generates a gate driving signal in a pre-charging phase and a driving phase in response to the gate line selection signal and a pre-charging control signal that controls an off-state of non-selected gate lines. In a time period of the driving phase in which a gate line is not selected, a node that has been in a floating state is held to a target voltage level in response to a hold control signal. The hold control signal is generated based upon a timing relationship between the gate line selection signal and the pre-charging control signal.

13 Claims, 8 Drawing Sheets

GATE DRIVER WITHOUT PRE-CHARGING CAPACITOR IN GATE DRIVING CIRCUIT

CROSS-REFERENCE TO RELATED APPLICATION

This application claims priority to and the benefit of Korean Patent Application No. 10-2008-0061711, filed on Jun. 27, 2008, in the Korean Intellectual Property Office, the entire content of which is incorporated by reference herein.

BACKGROUND

The present disclosure relates to a display panel driving apparatus and a method of driving the same, and more particularly, to a gate driver and a method of driving the same.

As demand for small electronic devices including display driving chips increases, research into how to reduce the size of display driving chips is being actively conducted. Accordingly, there has been a focus on developing suitably small circuits for small display driving chips of small electronic devices such as mobile devices.

SUMMARY

An exemplary embodiment of the present invention provides a gate driver for a small display driving chip.

An exemplary embodiment of the present invention also provides a method of driving the gate driver for a small display driving chip.

An exemplary embodiment of the present invention also provides a display panel driving apparatus including the gate driver for a small display driving chip.

According to an exemplary embodiment of the present invention, there is provided a gate driver including a decoder that decodes gate line selection data and that generates a gate line selection signal, and a gate driving circuit that generates a gate driving signal in a pre-charging phase and a driving phase in response to the gate line selection signal and a pre-charging control signal that controls an off-state of non-selected gate lines. In a time period of the driving phase in which a gate line is not selected, a node that has been in a floating state is held at a target voltage level in response to a hold control signal. The hold control signal is generated based upon a timing relationship between the gate line selection signal and the pre-charging control signal.

With respect to the gate driver, when the pre-charging control signal changes to a first logic level, the hold control signal may change to a second logic level, and when a predetermined time period has elapsed after any one gate line is selected by the gate line selection signal, the hold control signal may change to the first logic level.

With respect to the gate driver, when the hold control signal and the gate driving signal are generated, if all internal signals have a target voltage level in a time period of the driving phase in which a gate line is not selected, the node that has been in a floating state may be held at the target voltage level.

The gate driving circuit may include: a first switching circuit generating a gate driving signal in response to the gate line selection signal and the pre-charging control signal in each of a first node and a second node, wherein the first node is coupled to an input of the first switching circuit and the second node is determined based upon the voltage of the first node, wherein each of the first node and the second node generates; and a second switching circuit electrically connecting the first node to a first voltage supply terminal for a time period in which the first node is in a floating state based upon the hold control signal and the voltage level of second node.

With respect to the gate driver, in the pre-charging phase, the first switching circuit may hold the first node to have a first voltage and the second node to have a second voltage; in the time period of the driving phase in which the gate line selection signal has a first logic state, the first switching circuit may hold the first node to have a third voltage and the second node to have the first voltage; and in a time period of the driving phase in which the gate line selection signal has a second logic state, the first node may be in a floating state.

The first voltage may be a gate turn-off driving voltage. The second voltage may be a gate turn-on driving voltage. The third voltage may be a voltage needed to turn on a switching device that uses the first node as an input terminal.

Each of the switching devices may include a transistor.

The second switching circuit may include: a first switching device switching according to the voltage level of the hold control signal; and a second switching device switching according to the voltage level of the second node, wherein the first switching device and the second switching device are connected and arranged in series between the first node and the first voltage supply terminal.

Each of the gate line selection signal, the pre-charging control signal, and the hold control signal may be a level-shifted signal that swings in a voltage level range that is required in the gate driving circuit.

Each of the pre-charging control signal and the hold control signal may be level-shifted by a common level shifter and may be provided to all gate driving circuits.

The gate line selection signal may be level-shifted by a level shifter allocated to each gate driving circuit.

According to an exemplary embodiment of the present invention, there is provided a method of driving a gate driver, the method including: generating a gate line selection signal and a pre-charging control signal that controls an off-state of non-selected gate lines; generating a hold control signal to prevent the gate driver from being in a floating state based upon a timing relationship between the gate line selection signal and the pre-charging control signal; and holding a node in a gate driver that is in floating state in a time period of a driving phase in which a gate line is selected at a target voltage level in response to the hold control signal and an internal signal of the gate driver.

According to an exemplary embodiment of the present invention, there is provided a display panel driving apparatus including: a liquid crystal display panel including a plurality of gate lines and a plurality of data lines and displaying an image in pixel units having a liquid crystal display device, wherein the gate lines are perpendicular to the data lines, and the image is formed corresponding to a data voltage that is applied to the data lines according to a gate driving signal applied to the gate lines; a signal control unit generating gate line selection data for selecting the gate lines, image data to be displayed by the liquid display device, a pre-charging control signal that controls an off-state of non-selected gate lines, and a hold control signal; a gate driver that decodes the gate line selection data and generates a gate line selection signal, generates a gate driving signal in each of a pre-charging phase and a driving phase in response to the gate line selection signal and the pre-charging control signal, wherein in a time period of the driving phase in which a gate line is not selected, a node that has been floated is held at a target voltage level in response to the hold control signal generated based upon a timing relationship between the gate line selection signal and the pre-charging control signal; and a data driver generating a data voltage corresponding to the image data and applying the data voltage to a corresponding data line.

The gate driver may include: a first switching circuit generating a gate driving signal in response to the gate line selection signal and the pre-charging control signal in each of a first node and a second node, wherein the first node is coupled to an input of the first switching circuit and the second node is determined based upon the voltage of the first node; and a second switching circuit electrically connecting the first node to a first voltage supply terminal for a time period in which the first node is in a floating state based upon the hold control signal and the voltage level of second node.

With respect to the display panel driving apparatus, in the pre-charging phase, the first switching circuit may maintain the first node to have a first voltage and the second node to have a second voltage. In the time period of the driving phase in which the gate line selection signal has a first logic state, the first switching circuit may maintain the first node to have a third voltage and the second node may be held at the first voltage. In a time period of the driving phase in which the gate line selection signal has a second logic state, the first node may be in a floating state.

The second switching circuit may include: a first switching device switching according to the voltage level of the hold control signal; and a second switching device switching according to the voltage level of the second node, wherein the first switching device and the second switching device are connected and arranged in series between the first node and the first voltage supply terminal.

Each of switching devices that constitute the first switching circuit may include a capacitor.

BRIEF DESCRIPTION OF THE DRAWINGS

Exemplary embodiments of the present invention will be more clearly understood from the following detailed description taken in conjunction with the accompanying drawings in which.

DETAILED DESCRIPTION OF THE EXEMPLARY EMBODIMENTS

Figure 1:
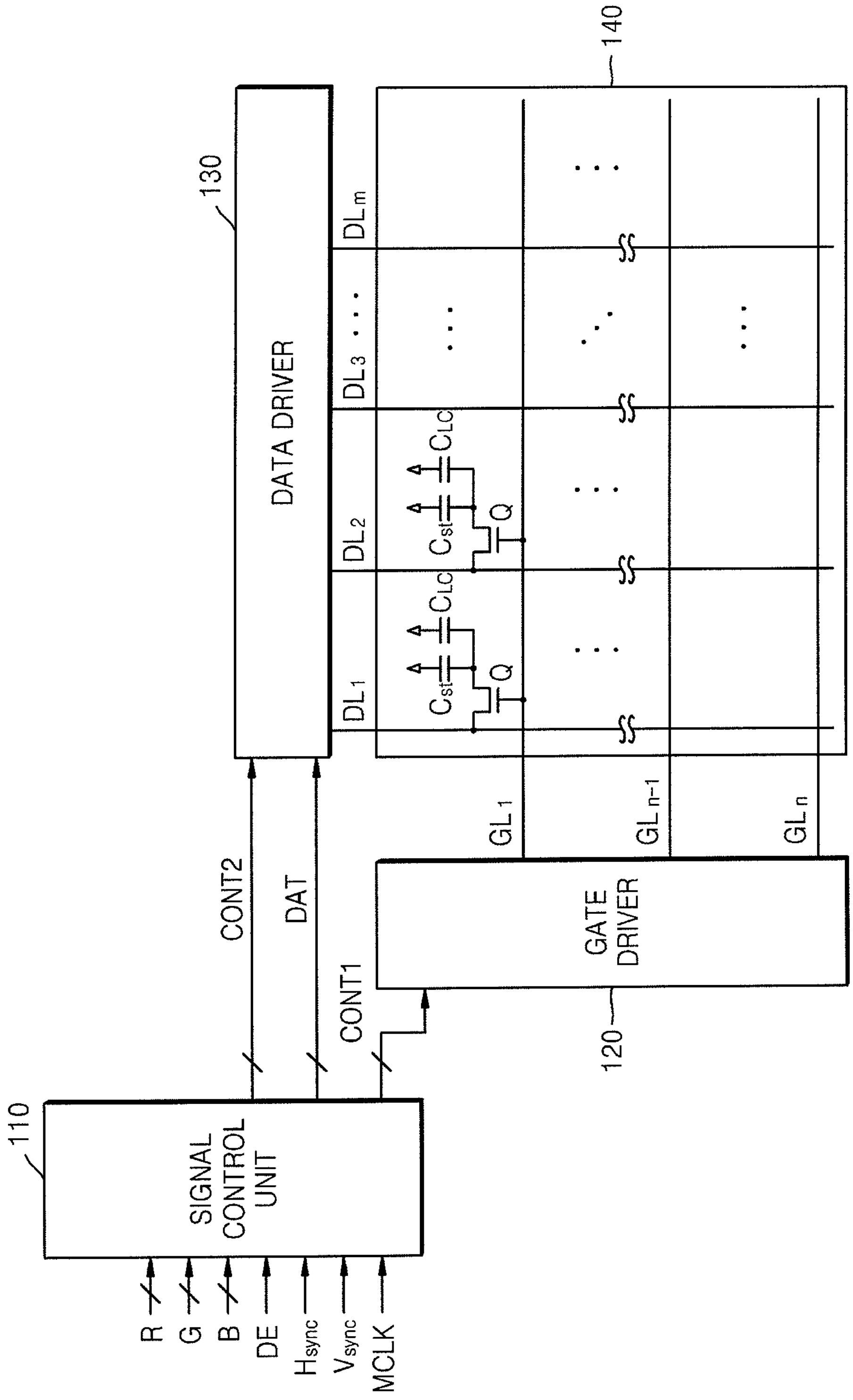
FIG. 1 illustrates the structure of an exemplary embodiment of a display panel driving apparatus in accordance with the present invention.

Referring now to FIG. 1, the display panel driving apparatus in accordance with an exemplary embodiment of the present invention includes a signal control unit 110, a gate driver 120, a data driver 130, and a display panel 140.

In the display panel 140, n gate lines $GL_1, \ldots GL_{n-1}, GL_n$ are aligned in a first direction and m data lines $DL_1$, $DL_2$, $DL_3, \ldots DL_m$ are aligned in a second direction that is substantially perpendicular to the first direction, thereby forming a plurality of pixels disposed in a matrix structure.

A circuit forming each pixel includes a thin film transistor Q connected to one of the gate lines $GL_1, \ldots GL_{n-1}, GL_n$ and one of the data lines $DL_1, DL_2, DL_3, \ldots DL_m$, a liquid crystal capacitor $C_{LC}$, and a sustain capacitor $C_{ST}$. In some cases, the sustain capacitor $C_{ST}$ is not used.

The signal control unit 110 receives red (R), green (G), and blue (B) image signals and input control signals for controlling an image signal display. These image signals and input control signals are transmitted from an external graphic controller (not shown). Examples of input control signals include a vertical synchronizing signal (Vsync) and a horizontal synchronizing signal (Hsync), a main clock (MCLK), and a data enable signal (DE). The signal control unit 110 controls R, G, and B image signals to be appropriate for the resolution of a liquid crystal display panel based upon R, G, and B image signals and input control signals. The signal control unit 110 generates control signals, such as gate control signal CONT1 and data control signal CONT2, and then transmits the gate control signal CONT1 to the gate driver 120 and transmits the data control signal CONT2 and a controlled image signal DAT to the data driver 130.

Examples of the gate control signal CONT1 include a gate line control signal for sequentially enabling gate lines, a clock signal, and an output enable signal for defining how long a gate line is to be turned on.

Examples of the data control signal CONT2 include a horizontal synchronizing signal (Hsync) for informing the start of image data DAT input, a load signal for applying data voltage corresponding to data lines $DL_1, DL_2, DL_3, \ldots DL_m$, and a data clock signal.

The data driver 130 sequentially receives image data for displaying pixels in a column according to the data control signal CONT2 that is input by the signal control unit 110, and applies a gradation voltage corresponding to the input image data DAT to a corresponding data line.

The gate driver 120 sequentially generates gate line driving signals for driving n gate lines $GL_1, \ldots GL_{n-1}, GL_n$ according to the gate control signal CONT1 that is input by the signal control unit 110 and transmits the gate line driving signals to corresponding gate lines.

The circuit structure of the gate driver 120 will now be described in more detail with reference to FIG. 2, which depicts in block diagram format the gate driver 120 illustrated in FIG. 1

The gate driver 120 includes a decoder 210, a common level shifter 220, and a gate driving circuit 230.

The decoder 210 receives a gate line control signal G [m:0] for selecting a gate line among n gate lines and outputs a gate line selection signal GDB [n:1] for turning on a thin film transistor (TFT) connected to the corresponding gate line.

The common level shifter 220 is used for all the gate lines. The common level shifter 220 receives a PREC signal that swings within a low voltage level range between a VSS voltage and a VDD voltage, and outputs a PRECH signal and a PRECHB signal which swings within a high voltage level range between a VGL voltage and a VGH voltage. The PREC signal is a pre-charging control signal that controls an off-state of non-selected gate lines. The PRECH signal and PRECHB signal are level-shifted pre-charging control signals. Herein, the PRECHB signal is an inverted PRECH signal. Herein, the VGL voltage refers to an output voltage of the gate driver 120 to turn off a TFT connected to a gate line, and the VGH voltage refers to an output voltage of the gate driver 120 to turn on a TFT connected to a gate line.

In an exemplary embodiment the VSS voltage is set at 0 V, the VDD voltage is set at 1.5 V, the VGL voltage is set at −8 V, and the VGH voltage is set at 15 V. However, these voltages may differ according to product specifications.

Figure 2:
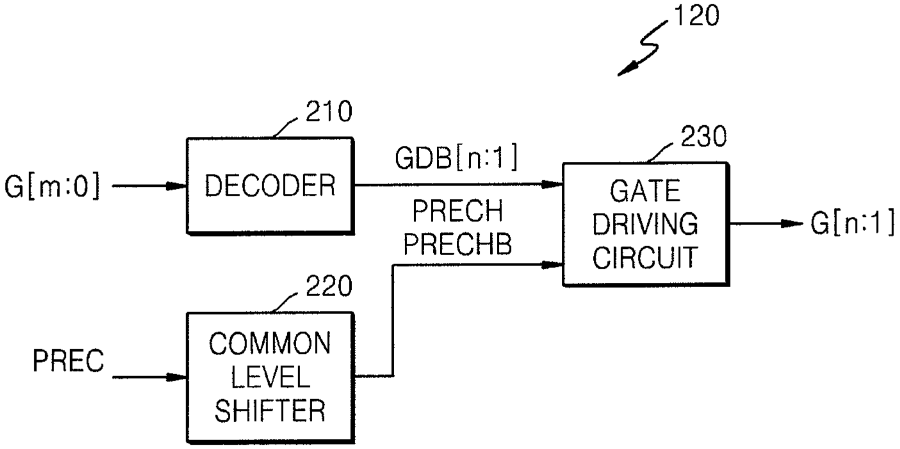
FIG. 2 is a block diagram illustrating a gate driver included in the display panel driving apparatus illustrated in FIG. 1.
Figure 3:
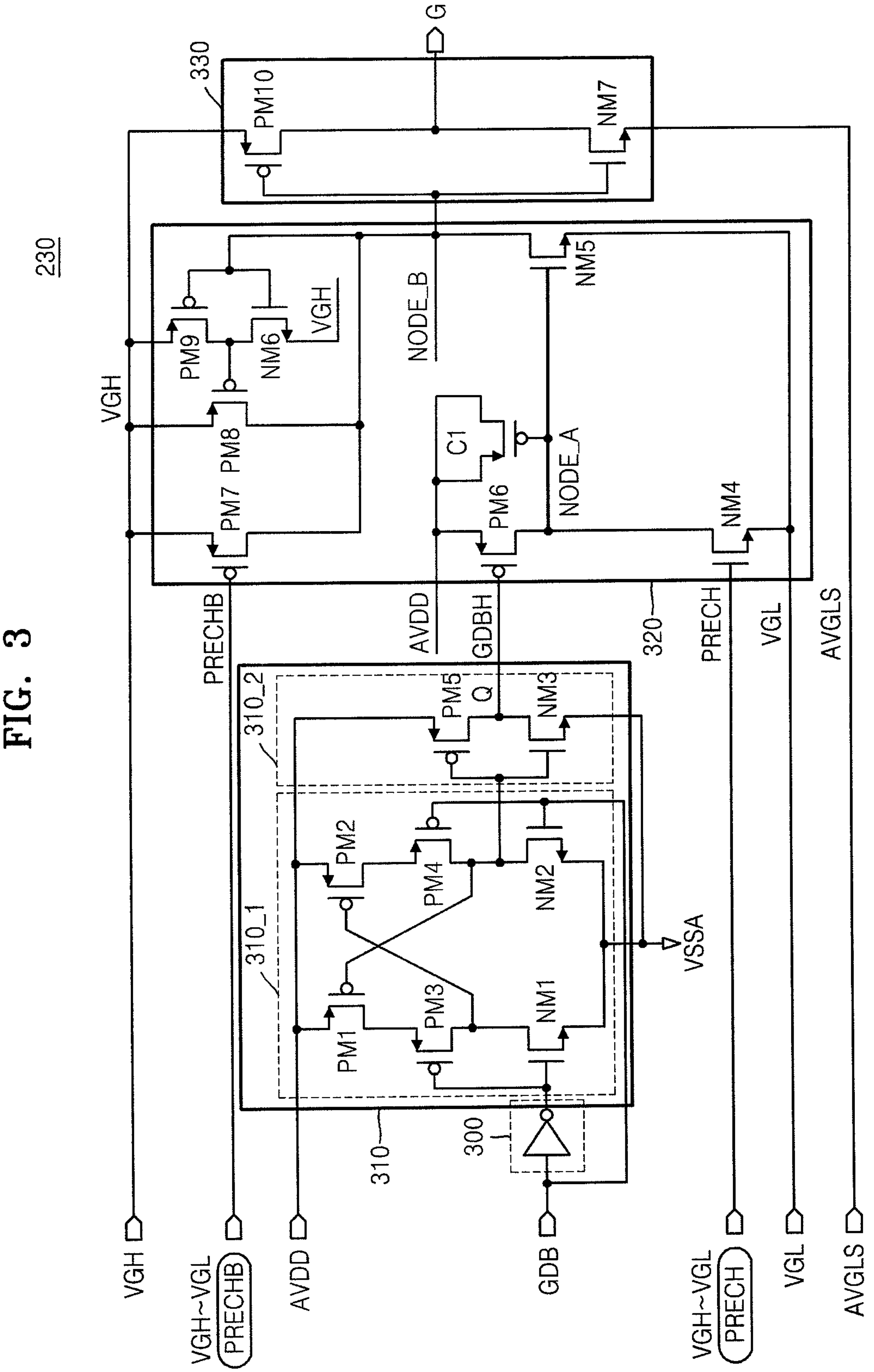
FIG. 3 is a circuit diagram of a gate driving circuit included in the gate driver illustrated in FIG. 2.

FIG. 3 is a circuit diagram of the gate driving circuit 230 illustrated in FIG. 2. The gate driving circuit 230 includes an inverter circuit 300, a level shifting circuit 310, a pre-charging circuit 320, and a buffer circuit 330.

The inverter circuit 300 inverts a logic state of the gate line selection signal GDB. However, in an exemplary embodiment, if the decoder 210 illustrated in FIG. 2 outputs the inverted logic state of the gate line selection signal GDB, the inverter circuit 300 is not needed.

The level shifting circuit 310 includes a level shifter 310-1 and a buffer 310-2.

Specifically, the level shifter 310-1 includes four PMOS transistors PM1, PM20, PM3, PM4 and two NMOS transistors NM1, NM2.

A source terminal of transistor PM1 and a source terminal of transistor PM2 are connected to an AVDD terminal. A source terminal of transistor PM3 is connected to a drain terminal of transistor PM1. A source terminal of transistor PM4 is connected to a drain terminal of transistor PM2. A gate terminal of transistor PM2 is connected to a drain terminal of transistor PM3. A gate terminal of transistor PM1 is connected to a drain terminal of transistor PM4. The drain terminal of transistor PM3 is connected to a drain terminal of transistor NM1. The drain terminal of transistor PM4 is connected to a drain terminal of transistor NM2. A source terminal of transistor NM1 and a source terminal of transistor NM2 are connected to a power source VSSA. A gate terminal of transistor PM4 and a gate terminal of transistor NM2 are connected to an input terminal of the gate line selection signal GDB, and a gate terminal of transistor PM3 and a gate terminal of transistor NM1 are connected to an output terminal of the inverter circuit 300.

The buffer 310-2 includes a PMOS transistor PM5 and an NMOS transistor NM3. Specifically, a source terminal of transistor PM5 is connected to the AVDD terminal. A drain terminal of transistor PM5 is connected to a drain terminal of transistor NM3. A source terminal of transistor NM3 is connected to the power source VSSA. A gate terminal of transistor PM5 and a gate terminal of transistor NM3 are connected to the drain terminal of transistor NM2. The drain terminal of transistor NM2 functions as an output terminal of the level shifter 310-1. Herein, the buffer 310-2 functions as an inverter.

In an exemplary embodiment the AVDD voltage is set at 5V and the VSSA voltage is a ground voltage, that is, 0 V.

The operation of the level shifting circuit 310 will now be described with reference to FIG. 3. The gate line selection signal GDB is a logic level signal that is input by the decoder 210 illustrated in FIG. 2 and swings within a low voltage level range between the VSS voltage and the VDD voltage. According to an exemplary embodiment of the present invention, the VSS voltage is set at 0 V and the VDD voltage is set at 1.5 V. However, these voltages may differ according to product specifications.

When the VSS voltage that has a logic level of "LOW" is applied to the input terminal of the gate line selection signal GDB, the output terminal of the inverter circuit 300 outputs the AVDD voltage that has a logic level of "HIGH." Accordingly, in the level shifter 310-1, transistor NM1 is turned on and transistor NM2 is turned off, and transistor PM3 is turned off and transistor PM4 is turned on, and thus, transistor PM1 is turned off and transistor PM2 is turned on. As a result, the drain terminal of transistor NM2 outputs the AVDD voltage that has a logic level of "HIGH." Accordingly, the AVDD voltage that has a logic level of "HIGH" is applied to an input terminal of the buffer 310-2 functioning as an inverter circuit and an output terminal Q of the buffer 310-2 outputs the VSS voltage that has a logic level of "LOW."

Then, when the VDD voltage that has a logic level of "HIGH" is applied to the input terminal of the gate line selection signal GDB, the output terminal of the inverter circuit 300 outputs the VSS voltage that has a logic level "LOW." As a result, in the level shifter 310-1, transistor NM1 is turned off and transistor NM2 is turned on, and transistor PM3 is turned on and transistor PM4 is turned off. Accordingly, transistor PM1 is turned on and transistor PM2 is turned off, and thus, the drain terminal of transistor NM2 outputs the VSS voltage that has a logic level "LOW." Accordingly, the VSS voltage that has a logic level "LOW" is applied to the input terminal of the buffer 310-2 functioning as an inverter circuit and thus, the output terminal Q of the buffer 310-2 outputs the AVDD voltage that has a logic level "HIGH."

As a result, due to the level shifting circuit 310, for example, the gate line selection signal GDB that swings in the voltage range between the VSS voltage (0 V) and the VDD voltage (1.5 V) is level-shifted to a GDBH signal that swings in the voltage range between the VSS voltage (0 V) and the AVDD voltage (5 V).

Still referring to FIG. 3, the pre-charging circuit 320 will be described in more detail. The pre-charging circuit 320 combines a plurality of PMOS transistors PM6, PM7, PM8, PM9, a plurality of NMOS transistors NM4, NM5, NM6, and a pre-charging capacitor C1 and generates signals corresponding to respective gate driving periods.

In particular, when, in the driving phase of the gate driver 120, the corresponding gate line is not selected and the state of TFT OFF is to be maintained, the pre-charging circuit 320 stably maintains a voltage level that controls a terminal that has been in a float state due to the corresponding transistor being turned off to retain the state of TFT OFF.

The structure of the pre-charging circuit 320 will now be described in more detail. A source terminal of transistor PM6 is connected to the AVDD terminal, a gate terminal of transistor PM6 is connected to a GDBH signal line, and a drain terminal of transistor PM6 is connected to a drain terminal of transistor NM4. The drain terminal of transistor PM6 is also connected to a gate terminal of transistor NM5. A source terminal of transistor NM4 is connected to a VGL terminal that is used to turn off a gate line. A gate terminal of transistor NM4 is connected to the PRECH signal that has been level-shifted. In addition, the pre-charging capacitor C1 is connected to the AVDD terminal and the gate terminal of transistor NM5, and disposed between the AVDD terminal and the gate terminal of transistor NM5. The pre-charging capacitor C1 may be a transistor. In the transistor, a source terminal and a drain terminal are common terminals connected to the AVDD terminal, and a gate terminal is connected to a NODE_A.

A source terminal of each of transistors PM7, PM8, PM9 is connected to a power source VGH that is used to turn on a gate line, and a gate terminal of transistor PM7 is connected to a PRECHB signal input terminal. A drain terminal of transistor PM9 is connected to a drain terminal of transistor NM6, and a gate terminal of transistor PM8 is connected to the drain terminal of transistor PM9 and a drain terminal of transistor NM6. A gate terminal of transistor PM9 and a gate terminal of transistor NM6 are connected to a drain terminal of transistor PM7, a drain terminal of transistor PM8, and a drain terminal of transistor NM5. A source terminal of transistor NM5 is connected to the VGL terminal.

The operation of the pre-charging circuit 320 of the gate driver will now be described in more detail in relation to a pre-charging phase and a driving phase.

In the pre-charging phase, a gate line selection signal GDB having a logic high VDD is input to the level shifting circuit 310 and a GDBH signal having the AVDD voltage is input to the gate terminal of PM6. Also, the PRECH signal has a VGH voltage, and the PRECHB signal has a VGL voltage. As a result, transistor PM6 is turned off and transistor NM4 is turned on, and thus, the voltage of the NODE_A is the VGL voltage. Accordingly, transistor NM5 is turned off and transistor PM8 is turned on, and thus, the voltage of a NODE_B is VGH, which is then changed to the VGL voltage in the buffer circuit 330 and finally, the VGL voltage is applied to the output terminal G of the gate driver 120. If the NODE_B has the VGH voltage, transistor PM9 is turned off and transistor NM6 is turned on, and thus, transistor PM8 is turned on. For a circuit including transistor PM8, transistor PM9 and transistor NM6, when transistor NM5 is turned off, the NODE_B has a previous logic state even when transistor PM7 is turned off.

Still referring to FIG. 3, the buffer circuit 330 substantially functions as an inverter. The buffer circuit 330 includes PMOS transistor PM10 and NMOS transistor NM7.

Turning now to the driving phase, the driving phase of a selected gate line includes two driving time periods.

In a time period in which a gate line is selected and a TFT-ON pulse needs to be generated, the gate line selection signal GDB has a VSS voltage having a low logic level and the GDBH signal also has the VSS voltage, and the PRECH signal has the VGL voltage and the PRECHB signal has the VGH voltage. As a result, transistor PM6 is turned on and transistor NM4 is turned off, and thus, the voltage of the NODE_A is changed from the VGL voltage to the AVDD voltage and transistor NM5 is turned on. Transistor PM7 and transistor PM8 are turned off and the voltage of NODE_B is the VGL voltage, which is then changed to the VGH voltage in the buffer circuit 330 and finally, the VGH voltage is applied to the output terminal G of the gate driver.

In a time period in which a gate line is not selected and a TFT-OFF pulse needs to be generated, the gate line selection signal GDB has a VDD voltage having a logic high level and the GDBH signal has a level-shifted AVDD voltage, and the PRECH signal and the PRECHB signal have the VGL voltage and the VGH voltage, respectively. As a result, transistor PM6 and transistor NM4 are turned off. In this case, although the NODE_A would be in a floating state at the VGL voltage, the NODE_A is maintained at the VGL voltage by the pre-charging capacitor C1 and the voltage of the NODE_B has the VGH voltage. Accordingly, the VGL voltage is applied to the output terminal G of the gate driver and a TFT of the corresponding gate line is turned off.

Although the size of the buffer circuit 330 can decrease, the decrease in size becomes limited because of space needed to accommodate rising/falling time of voltages as a function of charge injected into the gate (gate charge) of its transistors. Likewise, the decrease in the size of the pre-charging capacitor C1 becomes limited because of space needed for its accommodation of rising/falling time of voltages as a function of gate charge. As such, in the lay-out area of the buffer circuit 330 and the pre-charging capacitor C1 would occupy relatively large areas.

A GDBH signal, due to which the NODE_A is in a float state, has the AVDD voltage that has a logic high level, and a voltage change value ΔV (the NODE_A) when the PRECH signal changes from the VGH voltage to the VGL voltage is represented by Equation 1:

$$\Delta V(\text{Node\_A}) = \frac{C_{GD}}{C_{TOTAL} + C_{GD}}(V_{GH} - V_{GL}) \quad \text{[Equation 1]}$$

where $C_{TOTAL}$ denotes a pre-charging capacitance, $V_{GH}-V_{GL}$ denotes a voltage difference when the PRECH signal changes, and $C_{GD}$ denotes a gate-drain capacitance of the transistor NM4.

Referring to Equation 1, as the size of the pre-charging capacitor decreases, the NODE_A voltage is decreased to the VGL voltage or lower due to clock feed-through voltage error which results from capacitive coupling currents between the gate and drain.

Accordingly, as the size of the pre-charging capacitor increases, the NODE_A voltage change is small. As a result, a stable gate driver can be obtained. However, a circuit area of the gate driver is increased due to use of the pre-charging capacitor, which is a high-voltage MOS capacitor.

When the PRECH signal changes from the VGH voltage to the VGL voltage and transistor NM4 illustrated in FIG. 3 is switched from a turn-on state to a turn-off state, ΔV exceeds a threshold value due to the clock feed-through voltage errors. In this case, the PRECH signal may not recover to the VGL voltage and the gate driver may unstably operate.

To minimize the chip size of a gate driver, an integrated circuit is provided having a minimum pad pitch. Due to such a configuration, the gate driver may be situated in a region that is not affected by a dummy metal. Accordingly, an open area is exposed and thus, a leakage current may be generated when a halogen lamp is turned on/off in an alignment process performed on a probe station during evaluation. To prevent leakage of charge of a pre-charging capacitor of the gate driver caused by a flash effect, when a lay-out is prepared, it is determined whether a portion that can be affected when exposed to light opens and then a metal distribution should be manually controlled according to the identified result.

Unlike the gate driver including the pre-charging capacitor as described above, a gate driver according to an exemplary embodiment of the present invention does not include a pre-charging capacitor and performs the same function as the gate driver having the pre-charging capacitor.

Figure 4:
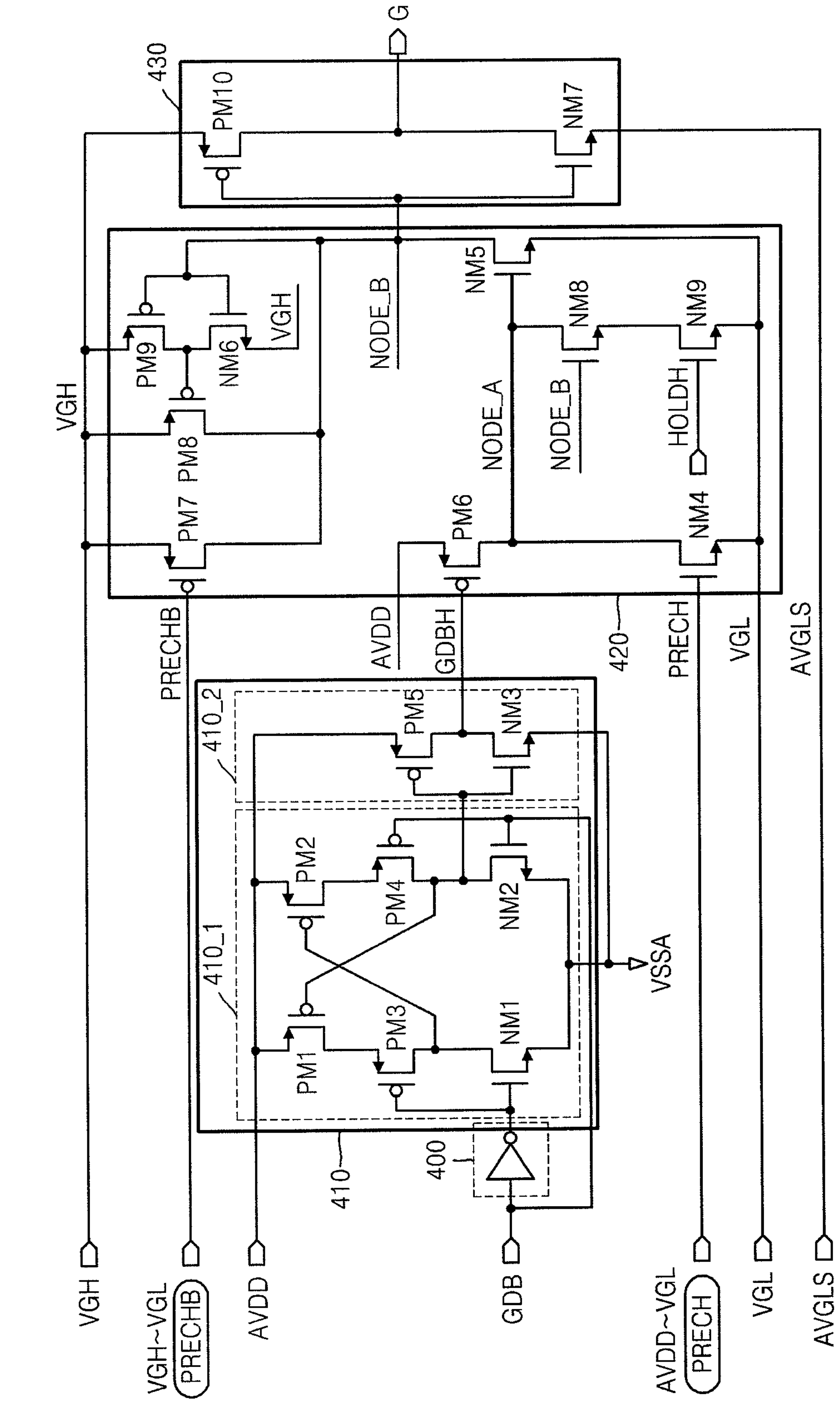
FIG. 4 is a circuit diagram of a gate driving circuit according to an exemplary embodiment of the present invention.

FIG. 4 is a circuit diagram of a gate driving circuit according to an exemplary embodiment of the present invention and includes an inverter circuit 400, a level shifting circuit 410, a pre-charging circuit 420, and a buffer circuit 430.

The inverter circuit 400, the level shifting circuit 410, and the buffer circuit 430 are substantially similar to the inverter circuit 300, the level shifting circuit 310, and the buffer circuit 330 in the gate driving circuit illustrated in FIG. 3. Accordingly, the inverter circuit 400, the level shifting circuit 410, and the buffer circuit 430 will not be described in further detail.

However, the gate driving circuit illustrated in FIG. 4 is different from the gate driving circuit illustrated in FIG. 3 in the pre-charging circuit 420. First, the pre-charging circuit 420 includes a plurality of NMOS transistors NM4, NM5, NM6, NM8, NM9 and a plurality of PMOS transistors PM6, PM7, PM8, PM9.

Specifically, an AVDD terminal is connected to a source terminal of transistor PM6. A gate terminal of transistor PM6 is connected to a GDBH signal line. A drain terminal of transistor PM6 is connected to a drain terminal of transistor NM4. The drain terminal of transistor PM6 is also connected to a gate terminal of transistor NM5. A source terminal of transistor NM4 is connected to a VGL terminal that is used to turn off a gate line. A gate terminal of transistor NM4 is connected to a PRECH signal terminal which transmits a PRECH signal that is level-shifted to a gate driving voltage. The PRECH signal is a pre-charging control signal.

The gate terminal of transistor NM5 corresponding to the NODE_A is connected to a drain terminal of transistor NM8. A source terminal of transistor NM8 is connected to a drain terminal of transistor NM9. A source terminal of transistor NM9 is connected to the VGL terminal corresponding to gate line off driving voltage. A gate terminal of transistor NM8 is connected to the NODE_B corresponding to a drain terminal of transistor NM5. A HOLDH signal is applied to a gate terminal of transistor NM9.

A source terminal of each of transistors PM7, PM8, PM9 is connected to a power source VGH that is used to turn on a gate line. A gate terminal of transistor PM7 is connected to a PRECHB signal input terminal. A drain terminal of transistor PM9 is connected to a drain terminal of transistor NM6. The gate terminal of transistor PM8 is connected to the drain terminal of transistor PM9 and the drain terminal of transistor NM6. The gate terminal of transistor PM9 is connected to the gate terminal of transistor NM6. The gate terminal of transistor PM9 and the gate terminal of transistor NM6 are connected to a drain terminal of transistor PM7, a drain terminal of transistor PM8, and a drain terminal of transistor NM5. A source terminal of transistor NM5 is connected to the VGL terminal.

As compared to the pre-charging circuit 320 illustrated in FIG. 3, the pre-charging circuit 420 illustrated in FIG. 4 does not use the pre-charging capacitor C1 and, instead, further includes transistors NM8, NM9 for switching.

Specifically, the pre-charging circuit 420 does not include a pre-charging capacitor C1 and further includes NMOS transistor NM8 and NMOS transistor NM9 arranged in a series between the NODE_A and the VGL terminal. The transistor NM8 and transistor NM9 are switching transistors. As a result, when the NODE_A is in a float state, transistor NM8 and transistor NM9 are turned on and the NODE_A is maintained at the VGL voltage. By using a HOLD signal, transistor NM8 and transistor NM9 performs the same function as the pre-charging capacitor. The HOLD signal rises when a predetermined time period Δt has elapsed after a gate line selection signal GDB[*] falls, and falls when the PRECH signal rises. The falling of the gate line selection signal GDB[*] means that a gate line selection signal GDB with respect to any one gate line among all gate lines falls.

For a gate driver, gate driving circuits transmit different gate output signals because gate lines are sequentially turned on according to a gate line control signal. Accordingly, if the NODE_A is switched using only transistor NM9 that is a HOLD switch, in all gate driving circuits, the nodes NODE_A have the VGL voltage and the nodes NODE_B have the VGH voltage. That is, all gate driving circuits output the VGL signal.

To prevent this occurrence, as illustrated in FIG. 4, transistor NM 8 is further arranged in series with respect to transistor NM9 that is a HOLD switch and a NODE_B signal that is an internal signal is applied to transistor NM8.

If a gate line is selected and a TFT-ON pulse needs to be generated, the VSS voltage (0 V) having a logic low level is applied to the GDB terminal and thus, the NODE_A has the AVDD voltage and the NODE_B has the VGL voltage. When a HOLD signal rises when the time period Δt, for example, 150 ns, has elapsed after the gate line selection signal GDB[*] falls, transistor NM 8 is turned off and then transistor NM9 is turned on, wherein transistor NM 8 functions as a switch receiving a NODE_B signal with respect to the corresponding gate line and transistor NM9 functions as a switch receiving the HOLD signal. Since transistor NM8 and transistor NM9 are connected to the NODE_A and the VGL terminal in series and transistor NM8 is turned off, the NODE_A is maintained at the AVDD voltage and the NODE_B has the VGL voltage. As a result, an output terminal G of a gate driver has the VGH voltage.

The reason why the HOLD signal rises when the time period Δt has elapsed after the gate line selection signal GDB [*] falls is to prevent the resulting turn on of both transistor NM8 and transistor NM9 due to simultaneous transition of the GDB[*] signal and the HOLD signal. The resulting generation of a short-current between transistor NM8 and NM9 would defeat the purpose of transistor NM8 functioning as a switch receiving the NODE_B signal at its gate. The time period Δt may differ according to the circuit design.

The pre-charging circuit 420 is driven as follows. As described above, when the gate driver is held to a TFT OFF state because a gate line is not selected in a driving phase, the pre-charging circuit 420 holds the NODE_A that has been in a float state at the VGL voltage for one horizontal synchronizing signal section.

The operation of the pre-charging circuit 420 of the gate driver will now be described using a pre-charging phase and a driving phase. In the pre-charging phase in which a gate active section does not overlap, a gate line control signal GDB having a VDD voltage that has a logic high level is input to the level shifting circuit 410, a GDBH signal having an AVDD voltage is input to the gate terminal of transistor PM6. The PRECH signal and the PRECHB signal have a VGH voltage and a VGL voltage, respectively. As a result, transistor PM6 is turned off and transistor NM4 is turned on, and thus, the NODE_A has the VGL voltage. Accordingly, transistor NM5 is turned off and transistor PM8 is turned on, and thus, the NODE_B has the VGH voltage, which is then changed to the VGL voltage in the buffer circuit 430 and finally, the VGL voltage is applied to the output terminal G of the gate driver. For reference, when the NODE_B has the VGH voltage, transistor PM9 is turned off and transistor NM6 is turned on and thus, transistor PM8 is turned on. For a circuit including transistor PM8, transistor PM9 and transistor NM6, when transistor NM5 is turned off, the NODE_B retains a previous logic state even when transistor PM7 is turned off.

In the pre-charging phase, regardless of the logic state of the HOLD signal, the NODE_A has the VGL voltage and the NODE_B has the VGH voltage. Accordingly, the VGL voltage is applied to the output terminal G of the gate driver.

Next, the driving phase of the selected gate line will now be described in more detail. First, in a time period in which the corresponding gate line is selected and a TFT-ON pulse needs to be generated, the gate line selection signal GDB has a VSS voltage that has a logic low level and the GDBH signal also has the VSS voltage, and thus, the PRECH signal and the PRECHB signal have respectively the VGL voltage and the VGH voltage. The HOLD signal is held to a logic low level, and then, when the time period Δt, for example, 150 ns has elapsed after the gate line selection signal GDB changes to a logic low level, the HOLD signal changes to a logic high level.

As a result, transistor PM6 is turned on and transistor NM4 is turned off, and thus, the voltage of the NODE_A is changed from the VGL voltage to the AVDD voltage and transistor NM5 is turned on. transistor PM7 and transistor PM8 are turned off, and thus, the NODE_B has the VGL voltage, which is then changed to the VGH voltage in the buffer circuit 430 and finally, the VGH voltage is applied to the output terminal G of the gate driver. Since the NODE_B has the VGL voltage, transistor NM8 is turned off. Accordingly, even when the HOLD signal is changed to a logic high level and transistor NM9 is turned on when a predetermined time period, for example, 150 ns, has elapsed after the gate line selection signal GDB is changed to a logic low level, the voltage of the NODE_A is held to the AVDD voltage.

Second, in a time period in which the corresponding gate line is not selected and a TFT-OFF pulse needs to be generated, the gate line selection signal GDB has the VDD voltage that has a logic high level, the GDBH signal has the AVDD voltage that is level-shifted, and the PRECH signal and the PRECHB signal respectively have the VGL voltage and the VGH voltage. As a result, transistor PM6 and transistor NM4 are turned off and thus, the voltage of the NODE_A is changed from the VGL voltage generated in the pre-charging phase to a floating state. However, since the NODE_B has the VGH voltage and the HOLD signal is changed to a logic high level when the time period Δt has elapsed after the gate line selection signal GDB[*] falls, each of transistor NM8 and transistor NM9 is turned on, and thus, the voltage of the NODE_A is held to the VGL voltage.

Accordingly, transistor NM8 and transistor NM9 perform the same function as the pre-charging capacitor C1 illustrated in FIG. 3.

Figure 5:
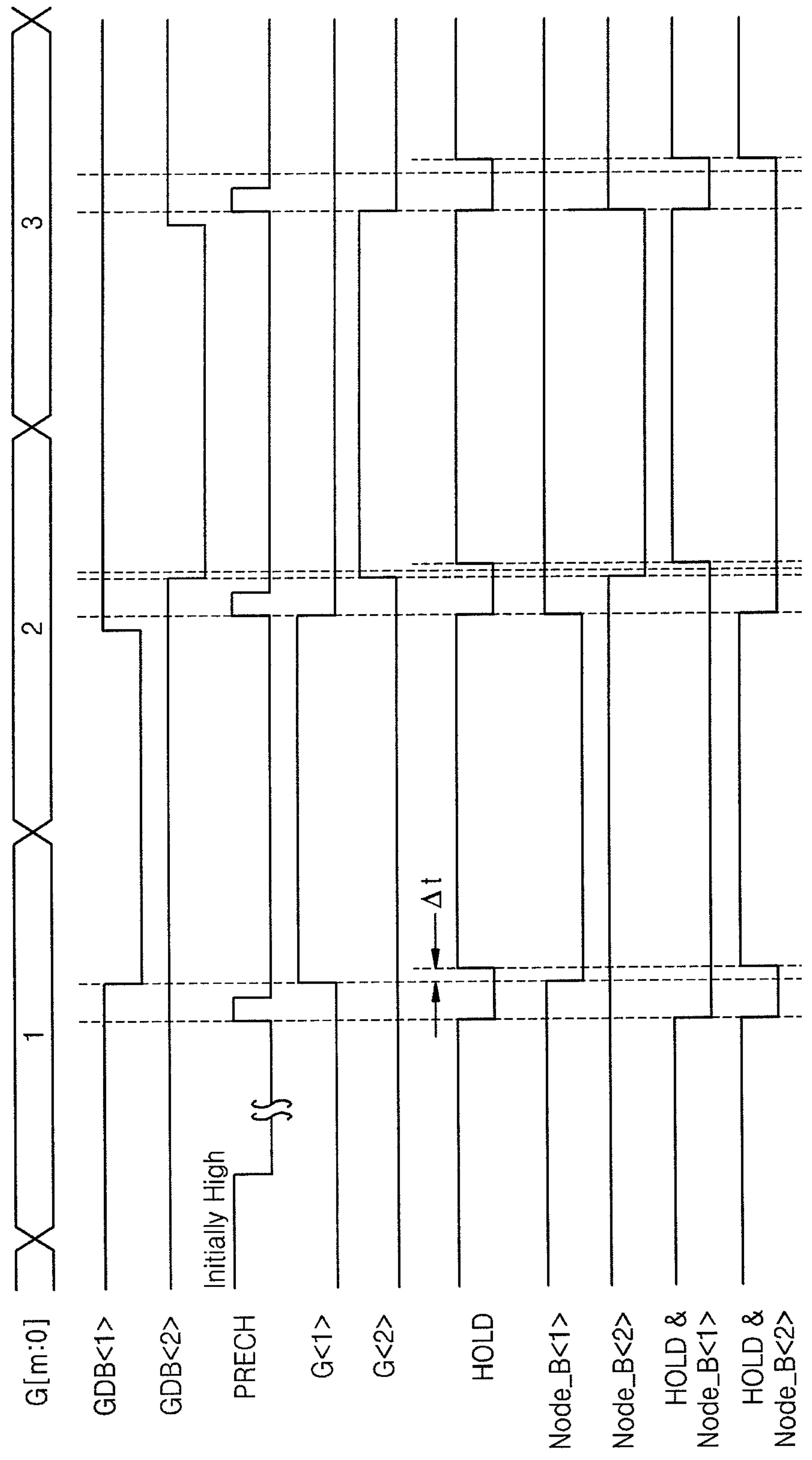
FIG. 5 is a timing diagram of primary signals used in a gate driver according to an exemplary embodiment of the present invention.

FIG. 5 is a timing diagram of primary signals used in a gate driver according to an exemplary embodiment of the present invention. A G[m:0] signal is a gate line control signal for selecting a gate line. A gate line selection signal GDB<1> signal is a first gate line selection signal that decodes the G[m:0] signal and generates a TFT-ON pulse for turning on TFTs connected to a first gate line. A gate line selection signal GDB<2> signal is a second gate line selection signal that decodes the G[m:0] signal and generates a TFT-ON pulse for turning on TFTs connected to a second gate line. A PRECH signal is a signal obtained by shifting a PREC signal to a high voltage level range. The PRECH signal is a pre-charging control signal. A G<1> signal is an output signal of a gate driving circuit that is to be input to the first gate line. A G<2> signal is an output signal of the gate driving circuit that is to be input to the second gate line. A HOLD signal is a control signal to hold a floating node in a gate driver. The HOLD signal rises when a predetermined time period has passed after the gate line selection signal GDB[*] falls, and falls when the PREC signal rises. A NODE_B<1> signal indicates a voltage of NODE_B of a gate driving circuit for the first gate line; a NODE_B<2> signal indicates a voltage of NODE_B of a gate driving circuit for the second gate line. A HOLD & NODE_B<1> signal indicates a result obtained by performing an AND operation on the HOLD signal and the NODE_B<1> signal. A HOLD & NODE_B<2> signal indicates a result obtained by performing an AND operation on the HOLD signal and the NODE_B<2> signal.

If the gate driving circuit illustrated in FIG. 4 is the gate driving circuit for the first gate line, the NODE_A that floats in a section in which the first gate line is not selected is maintained at a level of VGL by the HOLD & NODE_B<1> signal.

That is, as illustrated in FIG. 5, after the pre-charging phase occurs, in a section in which the first gate line is not selected, the NODE_A is prevented from floating by a HOLD & NODE_B<1> signal. In a section in which the HOLD & NODE_B<1> signal is maintained at a logic high state, the voltage of the NODE_A is maintained at VGL.

Likewise, in the gate driving circuit for the second gate line, in a section in which the HOLD & NODE_B<2> signal is maintained at a logic high state, the voltage of the NODE_A is maintained at VGL.

A HOLDH signal, which is an external signal, is input at a high voltage level to the gate driving circuit according to an exemplary embodiment of the present invention illustrated in FIG. 4. Accordingly, a HOLD signal that swings in a logic level range between the VSS voltage (0 V) and the VDD voltage (1.5 V) needs to be changed to a HOLD signal that swings in a logic level range between VGL (−8 V) and AVDD (5 V). To do this, a level shifter illustrated in FIG. 6 that is commonly used in all gate channels is further used.

Figure 6:
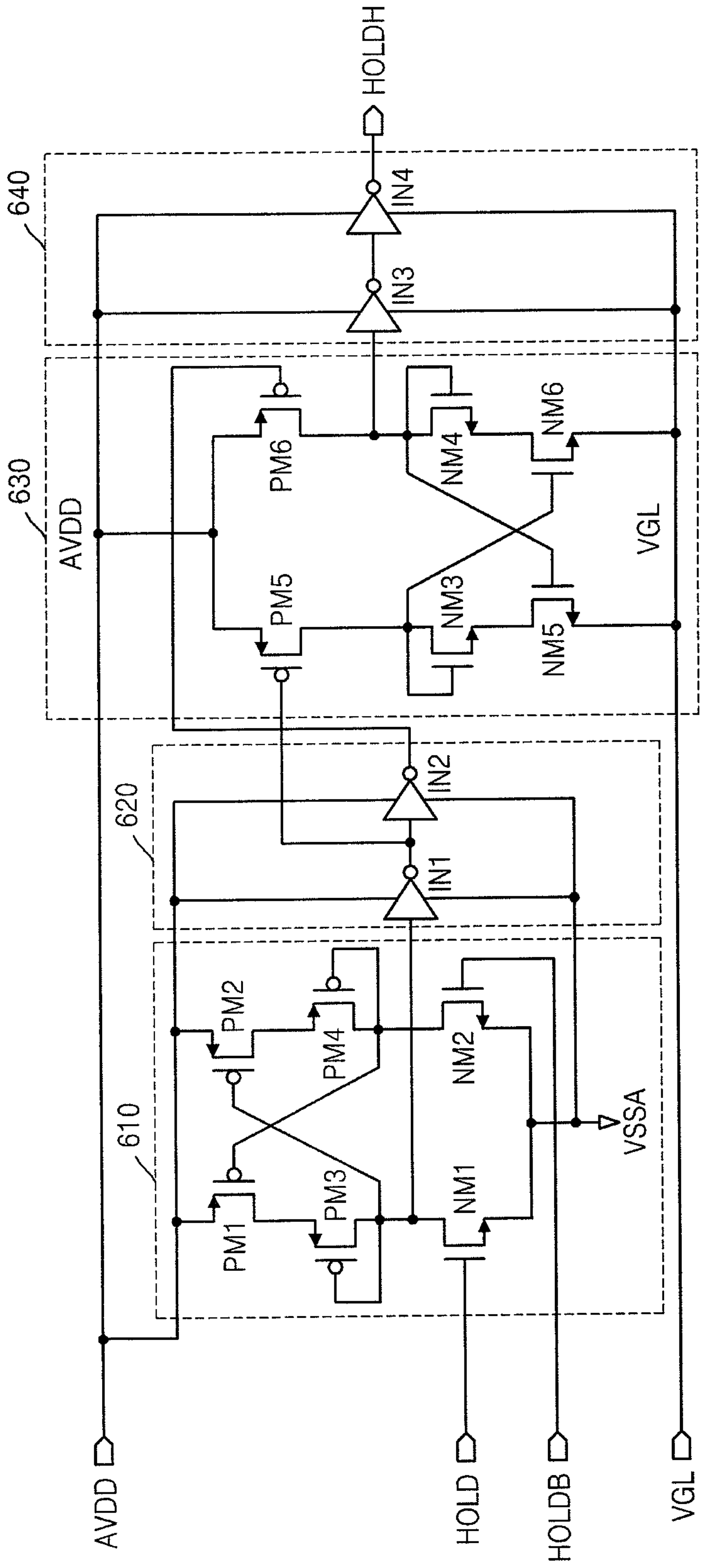
FIG. 6 is a circuit diagram of a level shifter for a HOLD signal, wherein the level shifter is used in a gate driver according to an exemplary embodiment of the present invention.

FIG. 6 is a circuit diagram of the level shifter for the HOLD signal. The level shifter for the HOLD signal includes a first level shifter 610, a first buffer circuit 620, a second level shifter 630, and a second buffer circuit 640.

The first level shifter 610 includes four PMOS transistors PM1, PM2, PM3, PM4 and two NMOS transistors NM1, NM2.

A source terminal of transistor PM1 and a source terminal of transistor PM2 are connected to a power source terminal AVDD. A source terminal of transistor PM3 is connected to a drain terminal of transistor PM1. A source terminal of transistor PM4 is connected to a drain terminal of transistor PM2. A gate terminal of transistor PM2 is connected to a drain terminal of transistor PM3. A gate terminal of transistor PM1 is connected to a drain terminal of transistor PM4. A gate terminal of transistor PM3 is connected to the drain terminal of transistor PM3. A gate terminal of transistor PM4 is connected to the drain terminal of transistor PM4. The drain terminal of transistor PM3 is connected to a drain terminal of NM1. The drain terminal of transistor PM4 is connected to a drain terminal of transistor NM2. A source terminal of transistor NM1 and a source terminal of transistor NM2 are connected to a VSSA terminal. A HOLDB signal is input to a gate terminal of transistor NM1 and a HOLD signal is input to a gate terminal of transistor NM2. The HOLDB signal is an inverted HOLD signal.

The first buffer circuit 620 includes two inverters IN1, IN2. An input terminal of IN1 is connected to a drain terminal of transistor NM1 that constitutes the first level shifter 610, and an output terminal of IN1 is connected to an input terminal of IN2.

According to the circuit structure as described above, a HOLD signal in a range between the VSS voltage (0 V) and the VDD voltage (1.5 V) may be level-shifted to a range between the VGL voltage (−8 V) and the AVDD voltage (5 V) at the output terminal of the first buffer circuit 620.

The second level shifter 630 includes two PMOS transistors PM5, PM6 and four NMOS transistors NM3, NM4, NM5, NM6.

A source terminal of transistor PM5 and a source terminal of transistor PM6 are connected to the power source terminal AVDD. A gate terminal of transistor PM5 is connected to the output terminal of IN1 of the first buffer circuit 620. A gate terminal of transistor PM6 is connected to an output terminal of IN2 of the first buffer circuit 620. A gate terminal of transistor NM3 is connected to a drain terminal of transistor NM3. The drain terminal of transistor NM3 is connected to a drain terminal of transistor PM5. A gate terminal of transistor NM4 is connected to a drain terminal of transistor NM4. The drain terminal of transistor NM4 is connected to a drain terminal of transistor PM6. A source terminal of transistor NM3 is connected to the drain terminal of transistor NM5. The source terminal of transistor NM4 is connected to a drain terminal of transistor NM6. A source terminal of the transistor NM5 and the source terminal of transistor NM6 are connected to a VGL terminal. A gate terminal of transistor NM5 is connected to the drain terminal of transistor NM4, and a gate terminal of transistor NM6 is connected to the drain terminal of transistor NM3.

According to the circuit structure as described above, the first level-shifted HOLD signal output from the output terminal of the first buffer circuit 620 of the first level shifter 610 is changed to a second level-shifted HOLDH signal output from an output terminal of the second buffer circuit 640 of the second level shifter 630 that swings in the voltage level range between VGL (−8 V) and AVDD (5 V). The second buffer circuit 640 includes two inverters IN3, IN4.

In essence, a HOLD signal that swings in the voltage level range between the VSS voltage (0 V) and the AVDD voltage (5 V) is inverted by the level shifter for the HOLD signal to a HOLDH signal that swings in the voltage level range between the VGL voltage (−8 V) and the AVDD voltage (5 V).

Although use of the level shifter for the HOLD signal contributes to an increase in the size of a chip, the chip including the level shifter is still smaller than that of a chip including a pre-charging capacitor.

In particular, such an increase in the size due to the use of the level shifter for the HOLD signal is negligible given that a gate driver used in all the channels (for example, ex. 320ch) of a driver IC increases a vertical length of the driver IC. Accordingly, the size of a gate driver chip is decreased and the manufacturing costs are reduced.

Also, in an exemplary embodiment of the present invention, the swing level of the PRECH signal is changed from the voltage level range between VGH (15 V) and VGL (−8V) to the voltage level range between AVDD (5 V) and VGL (−8V) and the size of the level shifter of the PREC signal is reduced and a clock feed-through phenomenon is degraded.

When the PRECH signal is changed from AVDD to VGL and transistor NM4 illustrated in FIG. 4 is switched from a turn-on state to a turn-off state, the voltage of the NODE_A is changed a little bit due to a clock feed-through phenomenon. However, within a relatively short time period, transistor NM8 and transistor NM9 are turned on and the voltage of the NODE_A is returned to the VGL level, and thus, latch-up does not occur.

Conventionally, when a pre-charging capacitor is used, a charge in a pre-charging capacitor in a gate driver is discharged due to a flash effect and thus, VGH and VGL are discharged and a leakage current occurs. However, in the current exemplary embodiment, a pre-charging capacitor is not used and thus, a leakage current does not occur.

Figure 7:
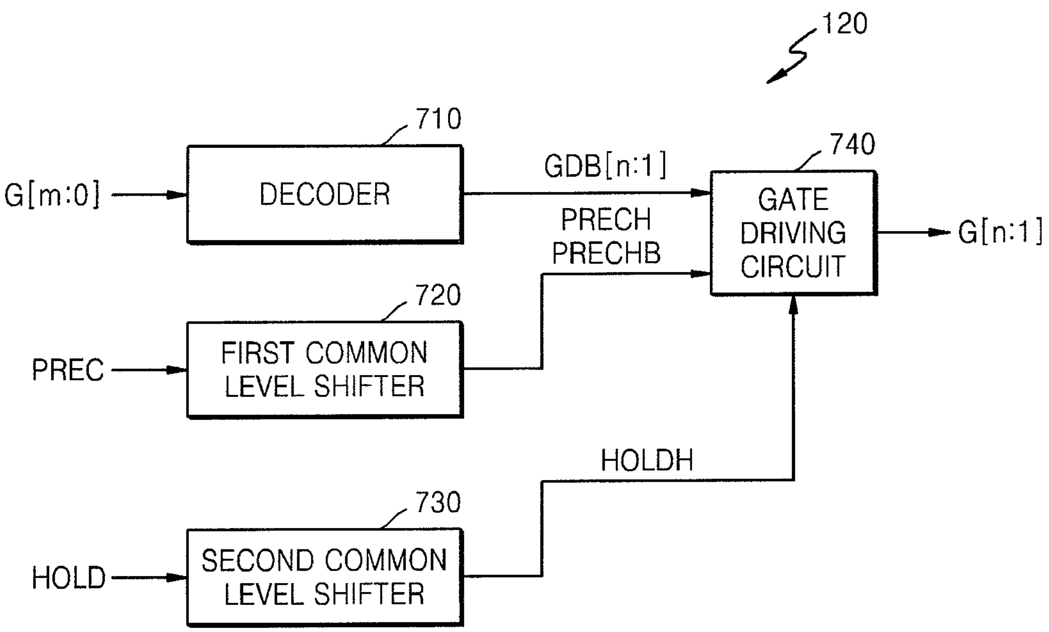
FIG. 7 is a block diagram illustrating a gate driver according to an exemplary embodiment of the present invention.

FIG. 7 is a block diagram illustrating a gate driver 120 including a gate driving circuit 740 that does not include a pre-charging capacitor as illustrated in FIG. 4. The gate driver 120 includes a decoder 710, a first common level shifter 720, a second common level shifter 730, and a gate driving circuit 740.

The decoder 710 receives a gate line control signal G[m:0] for selecting a gate line among n gate lines, and outputs a gate line selection signal GDB[n:1] for turning on TFTs connected to the corresponding gate line.

The first common level shifter 720 is commonly used by all the gate lines. The first common level shifter 720 receives a PREC signal that is a pre-charging control signal that swings in the voltage level range between the VSS voltage and the VDD voltage, and outputs a PRECH signal that swings in the voltage level range between the VGL voltage and the AVDD voltage and a PRECHB signal that swings in the voltage level range between the VGH voltage and the VGL voltage. Herein, the PRECHB signal is a inverted PRECH signal.

The second common level shifter 730 is commonly used by all the gate lines. The second common level shifter 730 receives a HOLD signal that swings in the voltage level range between the VSS voltage and the VDD voltage, and outputs a level-shifted HOLDH signal that swings in the voltage level range between the VGL voltage and the AVDD voltage. An example of the detailed circuit structure of the second common level shifter 730 is illustrated in FIG. 6.

In an exemplary embodiment the VSS voltage is 0 V, the VDD voltage is 1.5 V, the VGL voltage is −8 V, the VGH voltage is 15 V, and the AVDD voltage is 5 V. However, these voltages may differ according to product specifications.

The gate driving circuit 740 includes a pre-charging circuit operating such that without using a pre-charging capacitor, a floating section of a gate driver is reduced. For example, the gate driving circuit 740 can be the gate driving circuit illustrated in FIG. 4.

When the gate driver 120 illustrated in FIG. 7 is used in the display panel driving apparatus illustrated in FIG. 1, small display panels in which a gate driver is stably driven can be manufactured.

Figure 8:
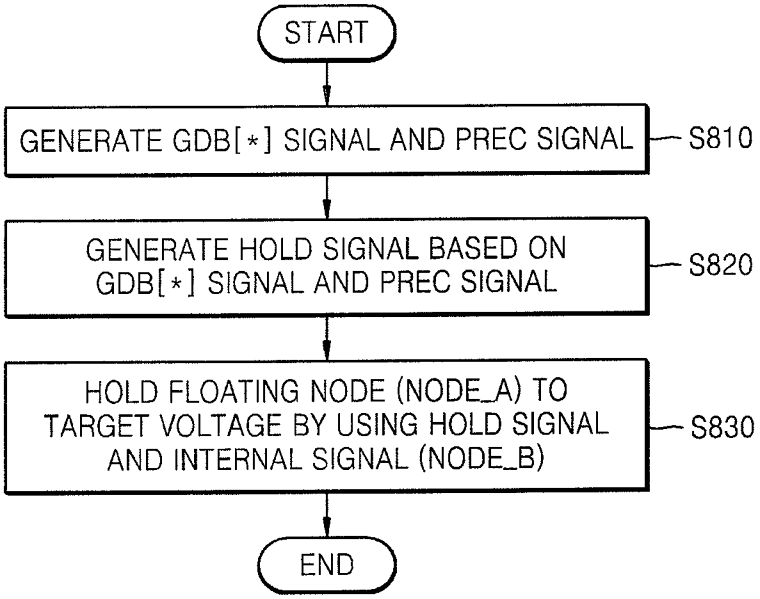
FIG. 8 is a flowchart illustrating a method of driving a gate driver, according to an exemplary embodiment of the present invention.

A method of driving a gate driver according to an exemplary embodiment of the present invention will now be described in more detail with reference to the flowchart of FIG. 8.

First, a display panel driving apparatus generates a gate line selection signal GDB[*] and a PREC signal to drive a gate driver, wherein the gate line selection signal GDB[*] is a gate line selection signal and the PREC signal is a pre-charging control signal (S810.)

Then, the display panel driving apparatus generates a HOLD signal based upon the gate line selection signal GDB [*] and the PREC signal (S820.) The HOLD signal changes to a second logic level when the PREC signal changes to a first logic level, and changes to the first logic level when a predetermined time period Δt has elapsed after any one gate line is selected by the gate line selection signal GDB[*] and becomes available.

Then, the gate driver of the display panel driving apparatus maintains the NODE_A that has been in a floating state at a target voltage by using a HOLD signal and an internal signal, for example, the NODE_B signal (operation S830.) That is, in a driving phase and in a time period in which a gate line is not selected, the NODE_A that has been in a floating state is switched to have the VGL voltage by using the HOLD signal and the NODE_B signal.

According to the circuit structure and the circuit operation, a gate driver is stably operated without using a pre-charging capacitor in a gate driving circuit.

While the present invention has been particularly shown and described with reference to exemplary embodiments thereof, it will be understood that various changes in form and details may be made therein without departing from the spirit and scope of the following claims.

What is claimed is:

1. A gate driver comprising:

a decoder that decodes gate line selection data and that generates a gate line selection signal; and a gate driving circuit that generates a gate driving signal in a pre-charging phase and in a driving phase in response to the gate line selection signal and a pre-charging control signal that controls an off-state of non-selected gate lines, wherein in a time period of the driving phase in which a gate line is not selected, a node that has been in a floating state is held at a target voltage level in response to a hold control signal, wherein the hold control signal is generated based upon a timing relationship between the gate line selection signal and the pre-charging control signal, wherein the gate driving circuit comprises:

a first switching circuit that generates a gate driving signal in response to the gate line selection signal and the pre-charging control signal at each of a first node and a second node, wherein the first node is coupled to an input of the first switching circuit and the second node is determined based upon a voltage of the first node, wherein a second switching circuit electrically connects the first node to a first voltage supply terminal for a time period in which the first node is in a floating state based upon the hold control signal and the voltage level of second node, wherein the second switching circuit comprises:

a first switching device that switches according to the voltage level of the hold control signal; and a second switching device that switches according to the voltage level of the second node, and wherein the first switching device and the second switching device are connected and arranged in series between the first node and the first voltage supply terminal.

2. The gate driver of claim 1, wherein:

when the pre-charging control signal changes to a first logic level, the hold control signal changes to a second logic level, and when a predetermined time period has elapsed after any one gate line is selected by the gate line selection signal, the hold control signal changes to the first logic level.

3. The gate driver of claim 1, wherein:

when the hold control signal and the gate driving signal are generated, if all of a plurality of internal signals of the gate driver have a target voltage level in a time period of the driving phase in which a gate line is not selected, the node that has been in a floating state is held at the target voltage level.

4. The gate driver of claim 1, wherein, in the pre-charging phase, the first switching circuit holds the first node to have a first voltage and the second node to have a second voltage;

in the time period of the driving phase in which the gate line selection signal has a first logic state, the first switching circuit holds the first node to have a third voltage and the second node to have the first voltage; and in a time period of the driving phase in which the gate line selection signal has a second logic state, the first node is in a floating state.

5. The gate driver of claim 4, wherein the first voltage is a gate turn-off driving voltage, the second voltage is a gate turn-on driving voltage, and the third voltage is a voltage that turns on a switching device that uses the first node as an input terminal.

6. The gate driver of claim 1, wherein each of the first switching device and the second switching device comprises a transistor.

7. The gate driver of claim 6, wherein the transistor comprises a MOS transistor.

8. The gate driver of claim 1, wherein each of the gate line selection signal, the pre-charging control signal, and the hold control signal is a level-shifted signal that swings in a voltage level range.

9. The gate driver of claim 8, wherein each of the pre-charging control signal and the hold control signal is level-shifted by a common level shifter and is provided to all gate driving circuits.

10. The gate driver of claim 8, wherein the gate line selection signal is level-shifted by a level shifter allocated to each gate driving circuit.

11. A display panel driving apparatus comprising:

a liquid crystal display panel that comprises a plurality of gate lines and a plurality of data lines and that displays an image in pixel units having a liquid crystal display device, wherein the gate lines are substantially perpendicular to the data lines, and the image corresponds to a data voltage applied to the data lines according to a gate driving signal applied to the gate lines;

a signal control unit that generates gate line selection data for selecting the gate lines, image data to be displayed by the liquid display device, a pre-charging control signal that controls an off-state of non-selected gate lines, and a hold control signal;

a gate driver that decodes the gate line selection data, that generates a gate line selection signal, that generates a gate driving signal in each of a pre-charging phase and a driving phase in response to the gate line selection signal and the pre-charging control signal, wherein in a time period of the driving phase in which a gate line is not selected, a node that has been floated is held at a target voltage level in response to the hold control signal generated based upon a timing relationship between the pre-charging control signal and the gate line selection signal; and a data driver that generates a data voltage corresponding to the image data and that applies the data voltage to a corresponding data line, wherein the gate driver comprises:

a first switching circuit that generates a gate driving signal in response to the gate line selection signal and the pre-charging control signal in each of a first node and a second node, wherein the first node is coupled to an input of the first switching circuit and the second node is determined based upon the voltage of the first node; and a second switching circuit that electrically connects the first node to a first voltage supply terminal for a time period in which the first node is in a floating state based upon the hold control signal and the voltage level of second node, wherein the second switching circuit comprises:

a first switching device that switches according to the voltage level of the hold control signal; and a second switching device that switches according to the voltage level of the second node, and wherein the first switching device and the second switching device are connected and arranged in series between the first node and the first voltage supply terminal.

12. The display panel driving apparatus of claim 11, wherein, in the pre-charging phase, the first switching circuit maintains the first node to have a first voltage and the second node to have a second voltage;

in the time period of the driving phase in which the gate line selection signal has a first logic state, the first switching circuit maintains the first node to have a third voltage and the second node is held at the first voltage; and in a time period of the driving phase in which the gate line selection signal has a second logic state, the first node is in a floating state.

13. The display panel driving apparatus of claim 11, wherein the first switching circuit further comprises a capacitor.

* * * * *